United States Patent
Prakash et al.

(10) Patent No.: US 10,903,945 B2
(45) Date of Patent: Jan. 26, 2021

(54) LOW LATENCY ACKNOWLEDGEMENT OR NEGATIVE ACKNOWLEDGEMENT

(71) Applicant: QUALCOMM Incorporated, San Diego, CA (US)

(72) Inventors: Rajat Prakash, San Diego, CA (US); Peerapol Tinnakornsrisuphap, San Diego, CA (US); Piyush Gupta, Bridgewater, NJ (US); Mostafa Khoshnevisan, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 16/272,709

(22) Filed: Feb. 11, 2019

(65) Prior Publication Data

US 2019/0253203 A1 Aug. 15, 2019

Related U.S. Application Data

(60) Provisional application No. 62/630,635, filed on Feb. 14, 2018.

(51) Int. Cl.
*H04W 4/00* (2018.01)
*H04L 1/18* (2006.01)
(Continued)

(52) U.S. Cl.
CPC .......... *H04L 1/1854* (2013.01); *H04L 1/0004* (2013.01); *H04L 5/0055* (2013.01);
(Continued)

(58) Field of Classification Search
None
See application file for complete search history.

(56) References Cited

U.S. PATENT DOCUMENTS

2012/0269180 A1* 10/2012 Li ................. H04L 5/0055
370/336
2013/0279481 A1* 10/2013 Horiuchi ........... H04W 72/0406
370/336
(Continued)

OTHER PUBLICATIONS

Samsung: "Corrections on HARQ Management," 3GPP Draft; R1-1800452 HARQ_Management, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018, Jan. 13, 2018, XP051384878, 6 Pages, Retrieved from the Internet: URL: http://www.3gpp.org/ftp/tsg%5FranWG1%5FRL1/TSGR1%5FAH/NR%5FAH%5F1801/Docs/ [retrieved on Jan. 13, 2018] p. 2-p. 3.
(Continued)

*Primary Examiner* — Gerald A Smarth
(74) *Attorney, Agent, or Firm* — Harrity & Harrity, LLP/QUALCOMM Incorporated

(57) ABSTRACT

Various aspects of the present disclosure generally relate to wireless communication. In some aspects, a user equipment (UE) may receive a downlink data communication. The UE may determine a processing time for the downlink data communication based at least in part on at least one of: whether the downlink data communication was scheduled via preconfigured scheduling or via a downlink grant received in a downlink control channel, or whether the downlink data communication is an initial transmission or a retransmission. The UE may transmit acknowledgement or negative acknowledgement (ACK/NACK) feedback, corresponding to the downlink data communication, using a timing indicated by the processing time. Numerous other aspects are provided.

30 Claims, 13 Drawing Sheets

(51) Int. Cl.
*H04W 72/04* (2009.01)
*H04W 72/12* (2009.01)
*H04L 5/00* (2006.01)
*H04W 28/02* (2009.01)
*H04L 1/00* (2006.01)
*H04W 72/14* (2009.01)

(52) U.S. Cl.
CPC ..... *H04W 28/0215* (2013.01); *H04W 72/042* (2013.01); *H04W 72/1278* (2013.01); *H04W 72/14* (2013.01)

(56) References Cited

U.S. PATENT DOCUMENTS

| | | | |
|---|---|---|---|
| 2014/0071952 A1* | 3/2014 | Kim | H04L 5/0037 370/335 |
| 2018/0049046 A1* | 2/2018 | Lunttila | H04L 1/1854 |
| 2018/0198570 A1* | 7/2018 | Astely | H04L 5/0053 |
| 2020/0015256 A1* | 1/2020 | Lee | H04W 72/14 |

OTHER PUBLICATIONS

Huawei, et al: "Remaining Issues on HARQ," 3GPP Draft; R1-1719401, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Nov. 18, 2017, XP051369310, 14 Pages, Retrieved from the Internet: URL: http://www.3gpp.org/ftp/tsg%5Fran/WG1%5FRL1/TSGR1%5F91/Docs/ [retrieved on Nov. 18, 2017] paragraph [02.5]; table 5.

Huawei, et al: "Summary of Remaining Issues on HARQ Management," 3GPP Draft; R1-1800036, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22-2018-Jan. 26, 2018, Jan. 13, 2018, XP051384539, 14 Pages, Retrieved from the Internet: URL: http://www.3gpp.org/ftp/tsg%5Fran/WG1%5FRL1/TSGR1%5FAH/NR%5FAH%5F1801/Docs/ [retrieved on Jan. 13, 2018] paragraph [02.2].

International Search Report and Written Opinion—PCT/US2019/017706—ISA/EPO—dated May 22, 2019.

QUALCOMM Incorporated: "Summary of DL/UL Scheduling and HARQ Management," 3GPP Draft; R1_1801247_SUMMARY_7.3.3.2_SCHEDULING_HARQ_V9, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018, Jan. 29, 2018, XP051385467, 16 pages, Retrieved from the Internet: URL: http://www.3gpp.org/ftp/tsg%5Fran/WG1%5FRL1/TSGR1%5FAH/NR%5FAH%5F1801/Docs/ [retrieved on Jan. 29, 2018] pp. 2, 3.

* cited by examiner

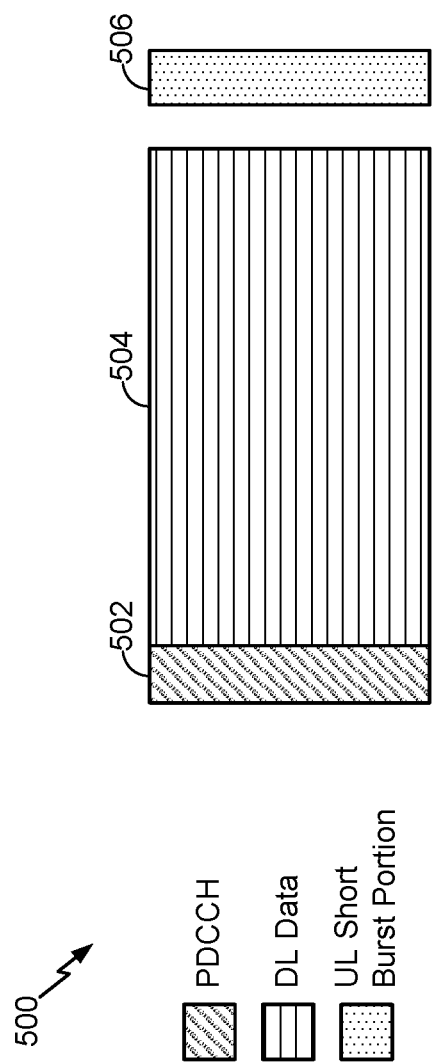
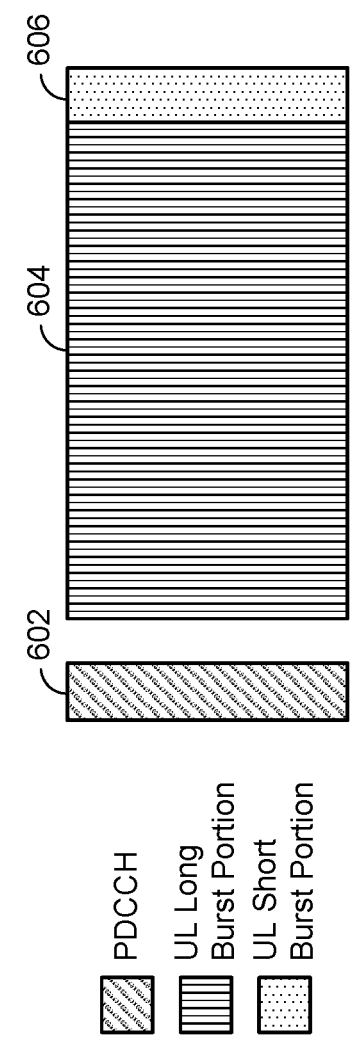

| PDSCH processing/decoding time N₁ (Symbols) | | |
|---|---|---|
| CS + Initial TX | DL grant + Initial TX | DL grant + Re-TX |
| [Short] | [Medium] | [Long] |
| ⋮ | ⋮ | ⋮ |
| ⋮ ~805 | ⋮ ~810 | ⋮ ~815 |

LOW LATENCY ACKNOWLEDGEMENT OR NEGATIVE ACKNOWLEDGEMENT

CROSS-REFERENCE TO RELATED APPLICATIONS UNDER 35 U.S.C. § 119

This application claims priority to U.S. Provisional Patent Application No. 62/630,635, filed on Feb. 14, 2018, entitled "TECHNIQUES AND APPARATUSES FOR LOW LATENCY ACKNOWLEDGEMENT OR NEGATIVE ACKNOWLEDGEMENT," which is hereby expressly incorporated by reference herein.

FIELD OF THE DISCLOSURE

Aspects of the present disclosure generally relate to wireless communication, and more particularly to techniques and apparatuses for low latency acknowledgement (ACK) or negative acknowledgement (NACK).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a downlink data communication; determining a processing time for the downlink data communication based at least in part on at least one of: whether the downlink data communication was scheduled via preconfigured scheduling or via a downlink grant received in a downlink control channel, or whether the downlink data communication is an initial transmission or a retransmission; and transmitting acknowledgement or negative acknowledgement (ACK/NACK) feedback, corresponding to the downlink data communication, using a timing indicated by the processing time.

In some aspects, a UE for wireless communication may include memory and one or more processors coupled to the memory. The memory and the one or more processors may be configured to receive a downlink data communication; determine a processing time for the downlink data communication based at least in part on at least one of: whether the downlink data communication was scheduled via preconfigured scheduling or via a downlink grant received in a downlink control channel, or whether the downlink data communication is an initial transmission or a retransmission; and transmit acknowledgement or negative acknowledgement (ACK/NACK) feedback, corresponding to the downlink data communication, using a timing indicated by the processing time.

In some aspects, a non-transitory computer-readable medium may store one or more instructions for wireless communication. The one or more instructions, when executed by one or more processors of a UE, may cause the one or more processors to receive a downlink data communication; determine a processing time for the downlink data communication based at least in part on at least one of: whether the downlink data communication was scheduled via preconfigured scheduling or via a downlink grant received in a downlink control channel, or whether the downlink data communication is an initial transmission or a retransmission; and transmit acknowledgement or negative acknowledgement (ACK/NACK) feedback, corresponding to the downlink data communication, using a timing indicated by the processing time.

In some aspects, an apparatus for wireless communication may include means for receiving a downlink data communication; means for determining a processing time for the downlink data communication based at least in part on at least one of: whether the downlink data communication was scheduled via preconfigured scheduling or via a downlink grant received in a downlink control channel, or whether the downlink data communication is an initial transmission or a retransmission; and means for transmitting acknowledgement or negative acknowledgement (ACK/NACK) feedback, corresponding to the downlink data communication, using a timing indicated by the processing time.

In some aspects, a method of wireless communication, performed by a base station, may include transmitting a downlink data communication; determining a processing time associated with the downlink data communication based at least in part on at least one of: whether the downlink data communication was scheduled via preconfigured scheduling or via a downlink grant transmitted in a downlink control channel, or whether the downlink data communication is an initial transmission or a retransmission; and monitoring for acknowledgement or negative acknowledgement (ACK/NACK) feedback, corresponding to the downlink data communication, using a timing indicated by the processing time.

In some aspects, a base station for wireless communication may include memory and one or more processors coupled to the memory. The memory and the one or more processors may be configured to transmit a downlink data communication; determine a processing time associated with the downlink data communication based at least in part on at least one of: whether the downlink data communication was scheduled via preconfigured scheduling or via a downlink grant transmitted in a downlink control channel, or whether the downlink data communication is an initial transmission or a retransmission; and monitor for acknowledgement or negative acknowledgement (ACK/NACK) feedback, corresponding to the downlink data communication, using a timing indicated by the processing time.

In some aspects, a non-transitory computer-readable medium may store one or more instructions for wireless communication. The one or more instructions, when executed by one or more processors of a base station, may cause the one or more processors to transmit a downlink data communication; determine a processing time associated with the downlink data communication based at least in part on at least one of: whether the downlink data communication was scheduled via preconfigured scheduling or via a downlink grant transmitted in a downlink control channel, or whether the downlink data communication is an initial transmission or a retransmission; and monitor for acknowledgement or negative acknowledgement (ACK/NACK) feedback, corresponding to the downlink data communication, using a timing indicated by the processing time.

In some aspects, an apparatus for wireless communication may include means for transmitting a downlink data communication; means for determining a processing time associated with the downlink data communication based at least in part on at least one of: whether the downlink data communication was scheduled via preconfigured scheduling or via a downlink grant transmitted in a downlink control channel, or whether the downlink data communication is an initial transmission or a retransmission; and means for monitoring for acknowledgement or negative acknowledgement (ACK/NACK) feedback, corresponding to the downlink data communication, using a timing indicated by the processing time.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of a downlink (DL)-centric subframe, in accordance with various aspects of the present disclosure.

FIG. 6 is a diagram illustrating an example of an uplink (UL)-centric subframe, in accordance with various aspects of the present disclosure.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
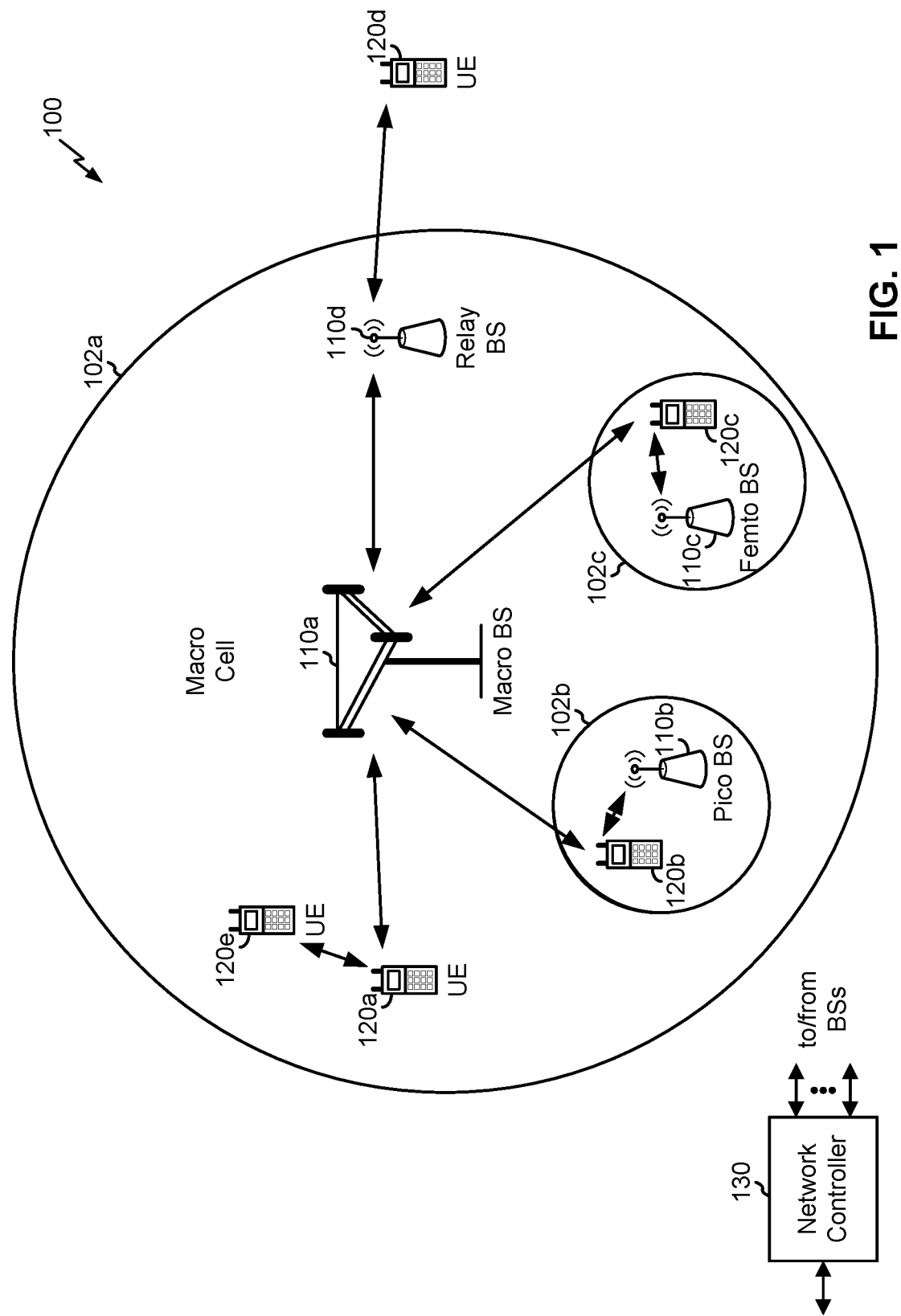
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network)

via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
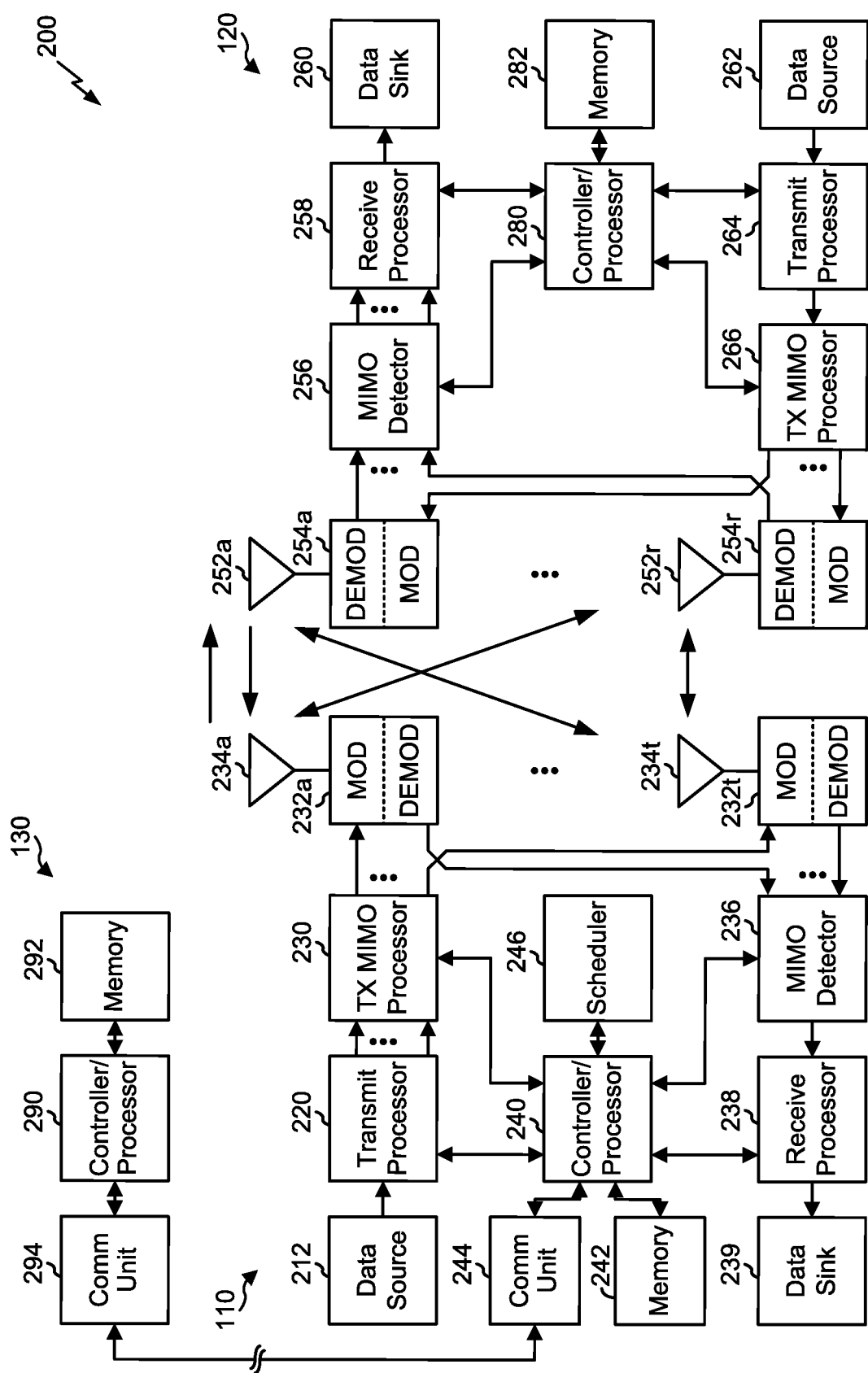
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with low latency ACK or NACK, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, process 1300 of FIG. 13, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving a downlink data communication; means for determining a processing time for the downlink data communication based at least in part on at least one of: whether the downlink data communication was scheduled via preconfigured scheduling or via a downlink grant received in a downlink control channel, or whether the downlink data communication is an initial transmission or a retransmission; means for transmitting acknowledgement or negative acknowledgement (ACK/NACK) feedback, corresponding to the downlink data communication, using a timing indicated by the processing time; and/or the like. In some aspects, such means may include one or more components of UE 120 described in connection with FIG. 2.

In some aspects, base station 110 may include means for transmitting a downlink data communication; means for determining a processing time associated with the downlink data communication based at least in part on at least one of: whether the downlink data communication was scheduled via preconfigured scheduling or via a downlink grant transmitted in a downlink control channel, or whether the downlink data communication is an initial transmission or a retransmission; means for monitoring for acknowledgement or negative acknowledgement (ACK/NACK) feedback, corresponding to the downlink data communication, using a timing indicated by the processing time; and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3A:
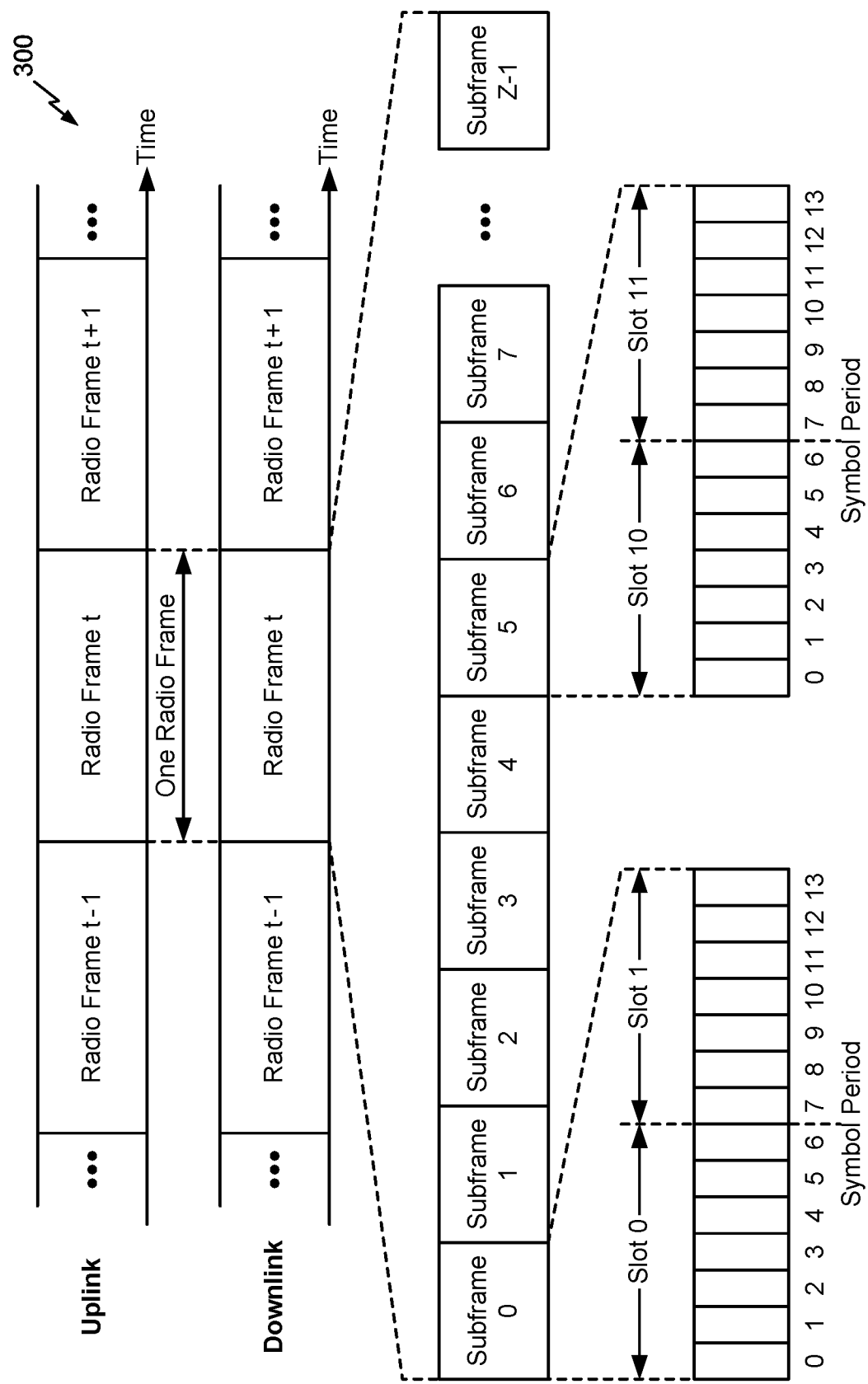
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
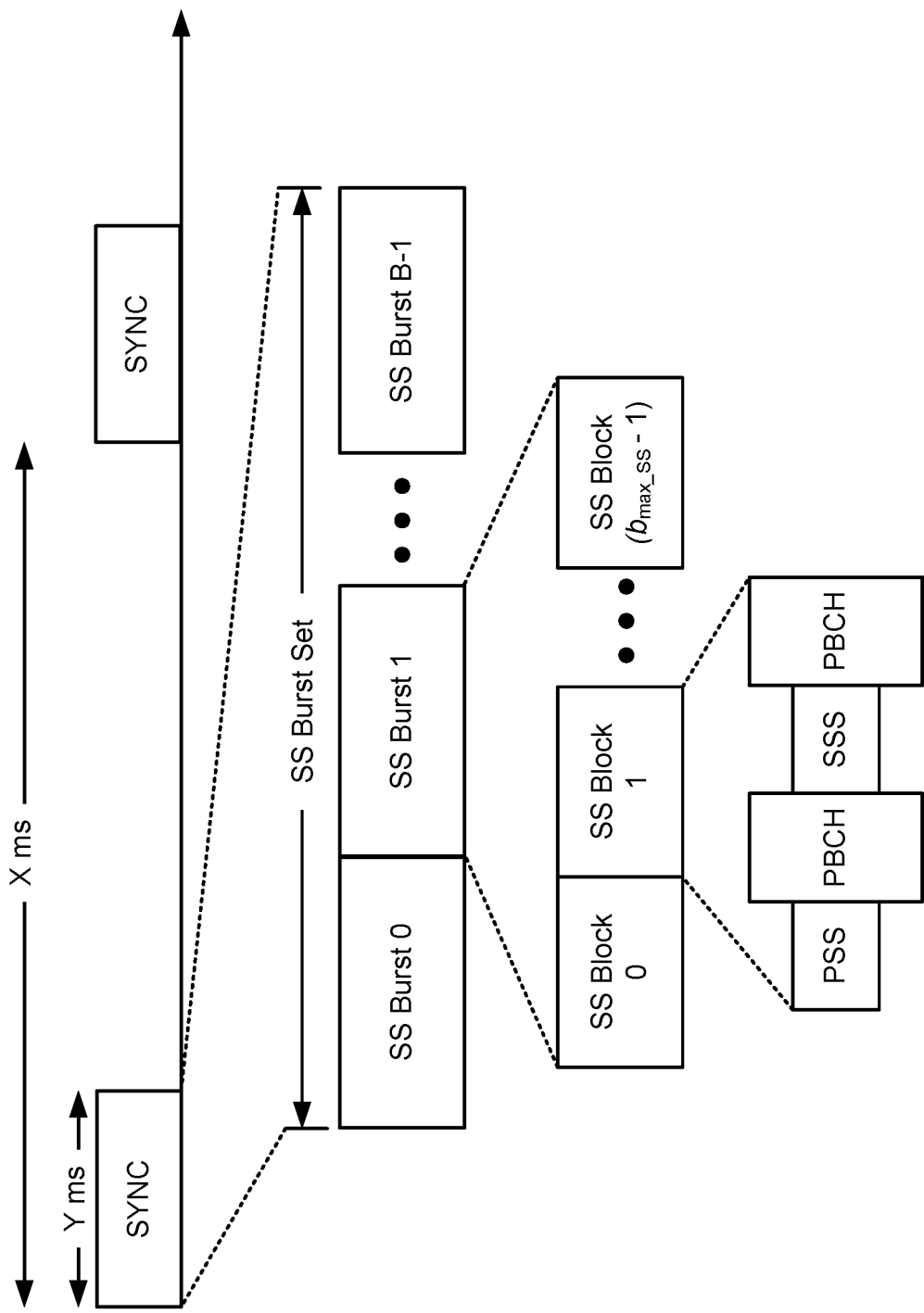
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe.

The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
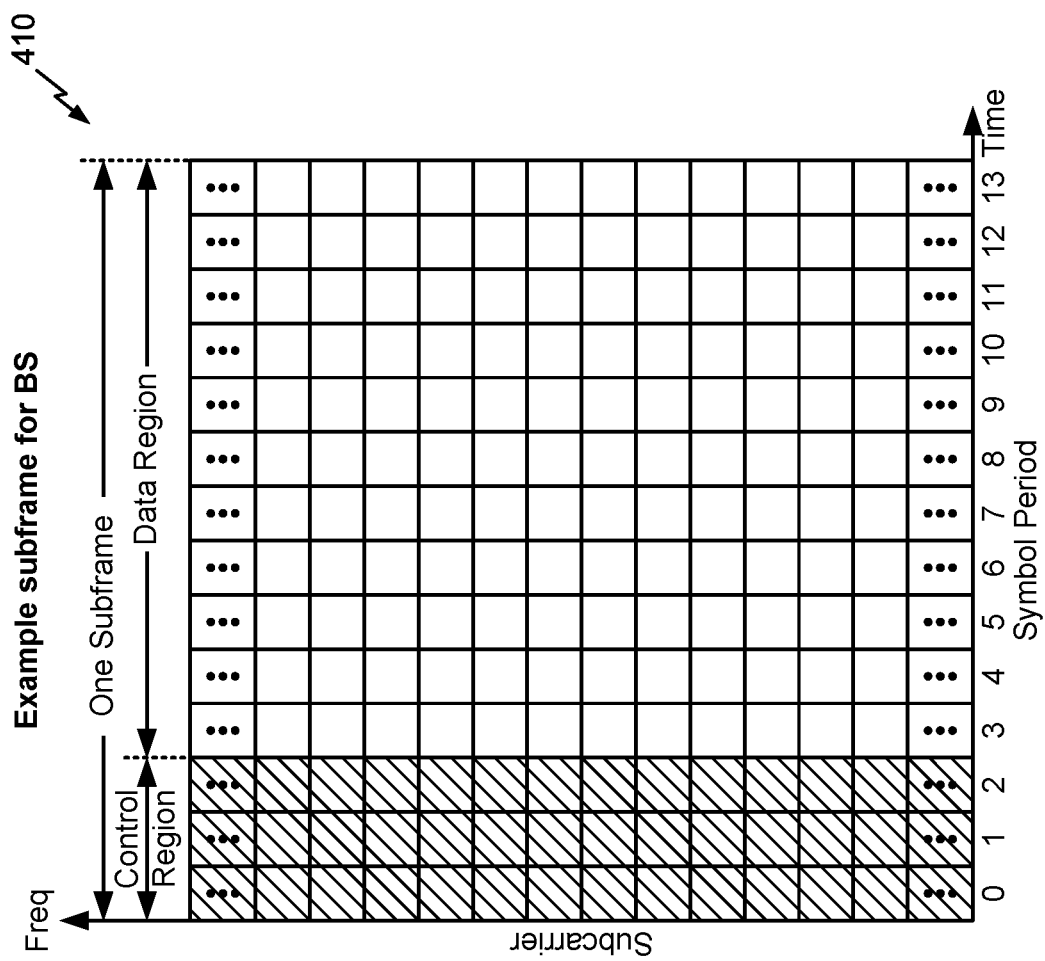
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q E {0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

FIG. 5 is a diagram 500 showing an example of a DL-centric subframe, transmission time interval (TTI), or wireless communication structure (referred to herein as a "DL-centric subframe" for the purpose of describing FIG. 5). The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PCFICH)), downlink control information (DCI), one or more grants (e.g., downlink grants, uplink grants, and/or the like), and/or the like.

The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include an UL short burst portion 506. The UL short burst portion 506 may sometimes be referred to as an UL burst, an UL burst portion, a common UL burst, a short burst, an UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric subframe. For example, the UL short burst portion 506 may include feedback information corresponding to the control portion 502 and/or the data portion 504. Non-limiting examples of information that may be included in the UL short burst portion 506 include an ACK (e.g., a PUCCH ACK, a PUSCH ACK, an immediate ACK), a NACK (e.g., a PUCCH NACK, a PUSCH NACK, an immediate NACK), a scheduling request (SR), a buffer status report (BSR), a hybrid automatic repeat request (HARD) indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 5 is provided merely as an example. Other examples are possible and may differ from what was described with regard to FIG. 5.

FIG. 6 is a diagram 600 showing an example of an UL-centric subframe, TTI, or wireless communication structure (referred to herein as an "UL-centric subframe" for the purpose of describing FIG. 6). The UL-centric subframe may include a control portion 602. The control portion 602 may exist in the initial or beginning portion of the UL-centric subframe. The control portion 602 of FIG. 6 may be similar to the control portion 502 described above with reference to FIG. 5. The UL-centric subframe may also include an UL long burst portion 604. The UL long burst portion 604 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 606. The UL short burst portion 606 of FIG. 6 may be similar to the UL short burst portion 506 described above with reference to FIG. 5, and may include any of the information described above in connection with FIG. 5. The foregoing is merely one example of an UL-centric wireless communication structure, and alternative structures having similar features may exist without necessarily deviating from the aspects described herein.

In some aspects, a wireless communication structure, such as a frame, may include UL-centric subframes, DL-centric subframes, UL-only subframes, and/or DL-only subframes. In some aspects, the ratio of different types of subframes (e.g., UL-centric, DL-centric, UL-only, and/or DL-only) in a frame may be dynamically adjusted based at least in part on the amount of UL data and/or the amount of DL data to be transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 6 is provided merely as an example. Other examples are possible and may differ from what was described with regard to FIG. 6.

Figure 7:
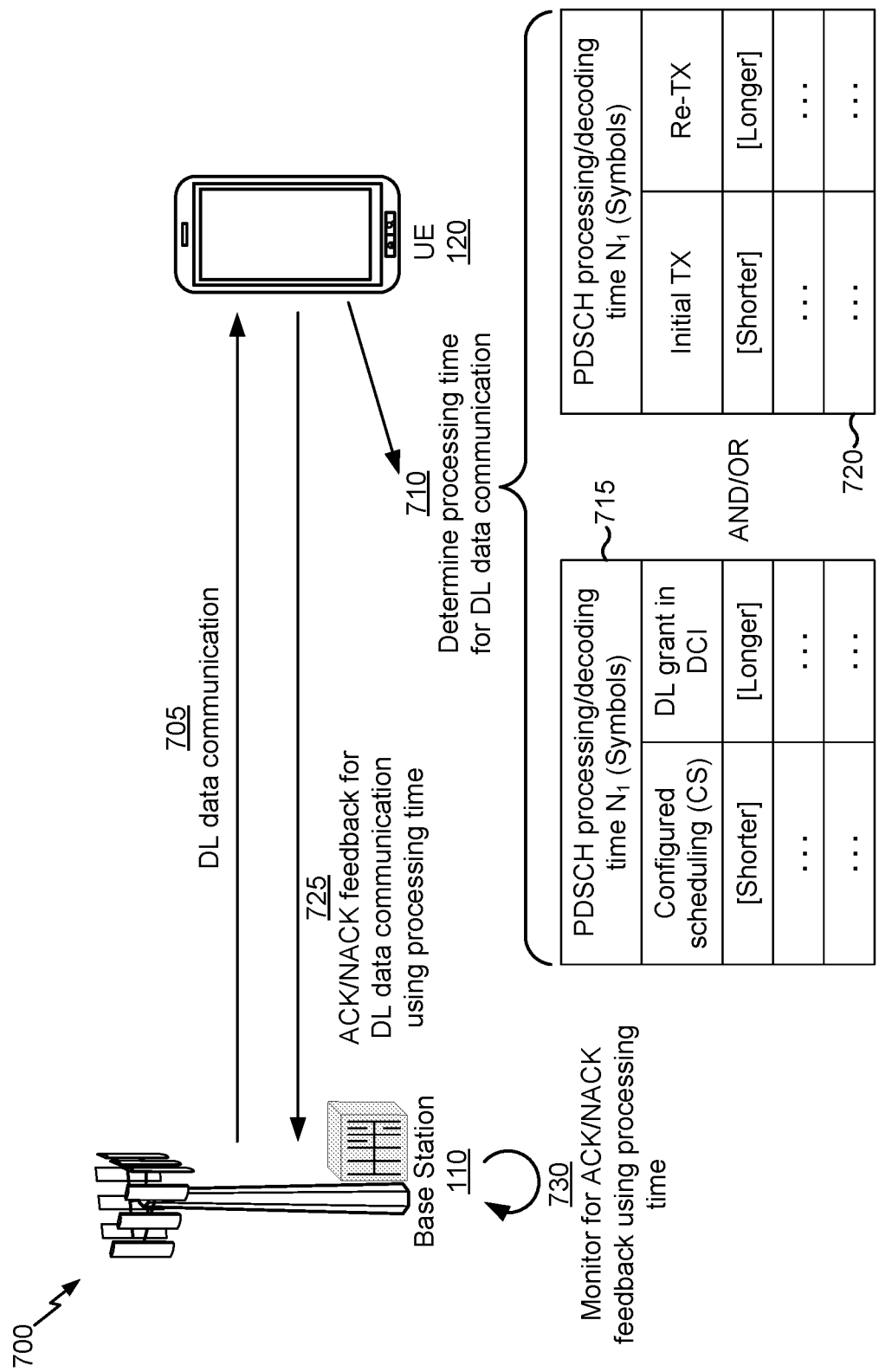
FIGS. 7-9 are diagrams illustrating examples of low latency acknowledgement (ACK) or negative acknowledgement (NACK), in accordance with various aspects of the present disclosure.

FIG. 7 is a diagram illustrating an example 700 of low latency ACK or NACK, in accordance with various aspects of the present disclosure.

As shown in FIG. 7, a base station 110 and a UE 120 may communicate with one another. In some aspects, communications between the base station 110 and the UE 120 may be associated with a low latency requirement and/or a high reliability requirement, such as an ultra-reliable low latency communication (URLLC) requirement. To achieve low latency, the UE 120 may need to be capable of quickly processing a received communication (e.g., one or more packets) and quickly generating and transmitting an ACK or a NACK, corresponding to the received communication, so that the base station 110 can re-transmit the packet if necessary (e.g., if the base station 110 receives a NACK). Typical processing by the UE 120 for a downlink data communication (e.g., a PDSCH communication and/or the like) includes processing (e.g., decoding) a downlink control communication (e.g., a PDCCH communication and/or the like), to obtain control information for the downlink data communication, and processing (e.g., decoding) the downlink data communication. In some aspects, this combined control channel (PDCCH) processing time and data channel (PDSCH) processing time may be referred to as "PDSCH processing time" or "PDSCH decoding time" in the 3GPP standard.

However, in some cases, the UE 120 may not need to process a control channel communication in order to process a data channel communication. For example, preconfigured scheduling (e.g., which may include preconfigured scheduling for uplink and/or downlink communications, such as semi-persistent scheduling (SPS), configured scheduling (CS), and/or the like) may be used to allocate resources for periodic use by the UE 120. In this case, the UE 120 may periodically monitor resources for downlink data communications according to a preconfigured scheduling configuration. This configuration may be indicated to the UE 120 once, such as in a radio resource control (RRC) message. In this way, the UE 120 can receive and process a downlink data communication without first processing a control channel communication for control information corresponding to the downlink data communication (e.g., a downlink grant and/or other DCI). Some techniques and apparatuses described herein permit the UE 120 to reduce the processing time for downlink data communications scheduled using preconfigured scheduling (e.g., as opposed to being scheduled using a downlink grant in DCI).

Furthermore, the UE 120 may require different processing times for initial transmissions and retransmissions. In some cases, processing an initial transmission may be less computationally complex than processing a retransmission, leading to faster processing times for initial transmissions as compared to retransmissions. For example, the UE 120 may apply more complex techniques to processing retransmissions as compared to initial transmissions, such as chase combining, incremental redundancy, decoding of coordinate multipoint (CoMP) transmissions, and/or the like. Additionally, or alternatively, a base station 110 may transmit an initial transmission with a less complex modulation and coding scheme (MCS) (and therefore target a better error rate) as compared to a retransmission, thus requiring performance of fewer iterations of a decode cycle of a decoder of the UE 120 (e.g., a low-density parity check decoder and/or the like), leading to faster processing times for initial transmissions as compared to retransmissions. Some techniques and apparatuses described herein permit the UE 120 to reduce the processing time for downlink data communications that are initial transmissions (e.g., as opposed to retransmissions).

As shown by reference number 705, the base station 110 may transmit, and the UE 120 may receive, a downlink data communication. The downlink data communication may include, for example, a PDSCH communication, an sPDSCH communication, and/or the like. In some aspects, the downlink data communication may be received in a downlink data portion of a TTI (e.g., a subframe, a slot, and/or the like).

As shown by reference number 710, the UE 120 may determine a processing time for the downlink data communication. In some aspects, the processing time may correspond to an $N_1$ value in a 3GPP standard. The $N_1$ value may represent a PDSCH processing or decoding time (e.g., which may include one or both of PDCCH processing or decoding time and PDSCH processing or decoding time, as described above). In some aspects, the processing time may indicate a number of symbols (e.g., an amount of time) from an end of reception of the downlink data communication to a beginning of transmission of acknowledgement or negative acknowledgement (ACK/NACK) feedback corresponding to the downlink data communication.

As shown by reference number 715, in some aspects, the UE 120 may determine the processing time based at least in part on whether the downlink data communication was scheduled via preconfigured scheduling or via a downlink grant received in a downlink control channel (e.g., in DCI of a PDCCH, an sPDCCH, and/or the like). As shown, the processing time may be shorter when the downlink data communication was scheduled via preconfigured scheduling, and may be longer when the downlink data communication was scheduled via a downlink grant received in the downlink control channel. In this way, the UE 120 may reduce latency, particularly in scenarios where the UE 120 uses preconfigured scheduling, such as a factory automation environment, which may require low latency.

In some aspects, if the downlink data communication was scheduled via preconfigured scheduling, then the processing time may be determined based at least in part on one or more parameters associated with the preconfigured scheduling. The one or more parameters may include, for example, a packet size associated with the preconfigured scheduling (e.g., a packet size allocated for periodic downlink data communications), a modulation and coding scheme (MCS) associated with the preconfigured scheduling (e.g., an MCS to be used for the periodic downlink data communications), and/or the like. In this case, a longer processing time may be used for downlink data communications associated with larger packet sizes and/or more complex modulation and coding schemes, and a shorter processing time may be used for downlink data communications associated with smaller packet sizes and/or less complex modulation and coding schemes.

As shown by reference number 720, in some aspects, the UE 120 may determine the processing time based at least in part on whether the downlink data communication is an initial transmission or a retransmission. As shown, the processing time may be shorter when the downlink data communication is an initial transmission, and may be longer when the downlink data communication is a retransmission. In this way, the UE 120 may reduce latency, particularly for initial transmissions, which may be received more frequently than retransmissions.

In some aspects, the UE 120 may determine the processing time using a determination of whether the downlink data communication was scheduled via preconfigured scheduling or via a downlink grant, and not using a determination of whether the downlink data communication is an initial transmission or a retransmission. In some aspects, the UE 120 may determine the processing time using a determination of whether the downlink data communication is an initial transmission or a retransmission, and not using a determination of whether the downlink data communication was scheduled via preconfigured scheduling or via a downlink grant. In some aspects, the UE 120 may determine the processing time using both a determination of whether the downlink data communication was scheduled via preconfigured scheduling or via a downlink grant and a determination of whether the downlink data communication is an initial transmission or a retransmission.

As shown in FIG. 7, the processing time may be determined using one or more tables. In some aspects, the one or more tables may be stored in memory of the UE 120. Additionally, or alternatively, the one or more tables may be stored in memory of the base station 110. As further shown, the one or more tables may include, for example, a table that indicates a set of processing times to be used when the downlink data communication is scheduled via preconfigured scheduling, a table that indicates a set of processing times to be used when the downlink data communication is scheduled via a downlink grant, a table that indicates a set of processing times to be used when the downlink data communication is an initial transmission, a table that indicates a set of processing times to be used when the downlink data communication is a retransmission, and/or the like. In some aspects, other tables and/or combinations of tables may be used, as described in more detail below in connection with FIG. 8

In some aspects, the processing time and/or the one or more tables may be prespecified and/or hard coded in memory of the UE 120 and/or the base station 110 (e.g., according to a 3GPP standard). Additionally, or alternatively, the base station 110 may signal the processing time and/or the information in the one or more tables to the UE 120 (e.g., in an RRC message and/or the like). In some aspects, the processing time may be determined based at least in part on a capability of the UE 120. For example, the UE 120 may use a capability of the UE 120 to identify (e.g., from a table) a processing time for the UE 120. Additionally, or alternatively, the UE 120 may signal a UE capability to the base station 110 (e.g., in an RRC message and/or the like), the base station 110 may determine a processing time associated with the UE 120 based at least in part on the UE capability (and/or information in the one or more tables), and may signal the processing time to the UE 120.

In some aspects, the base station 110 may signal the processing time to the UE 120 using a single value (e.g., a single processing time, or $N_1$, value). The base station 110 may determine the single value by determining a manner in which the downlink data communication was scheduled (e.g., via preconfigured scheduling or a downlink grant), a type of HARQ transmission of the downlink data communication (e.g., an initial transmission or a retransmission), a capability of the UE, and/or the like, and determining the single value based at least in part on one of these factors or a combination of these factors. As an example, the base station 110 may determine a processing time corresponding to a scenario where the downlink data communication is scheduled using preconfigured scheduling and is an initial transmission, and may signal a single processing time based on these combined factors. In this way, network resources may be conserved by transmitting a single value over the air.

Alternatively, the base station 110 may signal the processing time to the UE 120 using multiple values (e.g., multiple processing time, or $N_1$, values). For example, a first value may correspond to a scenario where the downlink data communication is scheduled using preconfigured scheduling, a second value may correspond to a scenario where the downlink data communication is an initial transmission, and/or the like.

As shown by reference number 725, the UE 120 may transmit, and the base station 110 may receive, acknowledgement or negative acknowledgement (ACK/NACK) feedback, corresponding to the downlink data communication, using a timing indicated by the processing time. For example, the UE 120 may begin transmitting the ACK/NACK feedback in a symbol that occurs $N_1$ symbols after a last symbol that includes the downlink data communication (e.g., where $N_1$ is the processing time).

As shown by reference number 730, the base station 110 may monitor for ACK/NACK feedback, corresponding to the downlink data communication, using a timing indicated by the processing time. In some aspects, the base station 110 may determine the processing time in a similar manner as the UE 120, as described above. The base station 110 may use the processing time to determine when to monitor for the ACK/NACK feedback, and may monitor for and/or receive the ACK/NACK feedback accordingly.

In some aspects, the base station 110 may make one or more scheduling or resource management decisions for the UE 120 based at least in part on the processing time and at least one of a reliability or latency requirement associated with the UE 120. For example, the base station 110 may determine when to expect ACK/NACK feedback for a downlink data communication, and may schedule other communications (e.g., retransmission of the downlink data communication, retransmission of other downlink data communications, transmission of other downlink communications, and/or the like) based at least in part on that determination.

In some aspects, the base station 110 may perform operations similar to those described herein as being performed by the UE 120, and/or the UE 120 may perform operations similar to those described herein as being performed by the base station 110. For example, the base station 110 may receive an uplink data communication from the UE 120. The base station 110 may determine a processing time for the uplink data communication based at least in part on at least one of: whether the uplink data communication was scheduled via preconfigured scheduling or via an uplink grant, or whether the uplink data communication is an initial transmission or a retransmission. The base station 110 may transmit ACK/NACK feedback, corresponding to the uplink data communication, using a timing indicated by the processing time.

Additionally, or alternatively, the UE 120 may transmit an uplink data communication and may determine a processing time associated with the uplink data communication based at least in part on at least one of: whether the uplink data communication was scheduled via preconfigured scheduling or via a downlink grant transmitted in a downlink control channel, or whether the uplink data communication is an initial transmission or a retransmission. The UE 120 may monitor for ACK/NACK feedback, corresponding to the uplink data communication, using a timing indicated by the processing time.

As indicated above, FIG. 7 is provided as an example. Other examples are possible and may differ from what was described with respect to FIG. 7.

Figure 8:

FIG. 8 is a diagram illustrating another example 800 of low latency ACK or NACK, in accordance with various aspects of the present disclosure.

FIG. 8 shows example tables that may be used to determine a processing time, as described elsewhere herein. In some aspects, one or more of the tables of FIG. 8 may be stored by a UE 120. Additionally, or alternatively, one or more of the tables of FIG. 8 may be stored by a base station 110. Additionally, or alternatively, information stored in the one or more tables (e.g., a processing time) may be signaled to the UE 120 by a base station 110.

As shown by reference number 805, a table used to determine a processing time may indicate a set of processing times to be used when the downlink data communication is scheduled via preconfigured scheduling and when the downlink data communication is an initial transmission. As shown, in some aspects, the processing time associated with preconfigured scheduling and initial transmissions may be shorter than a processing time associated with downlink grants and initial transmissions, and may be shorter than a processing time associated with downlink grants and retransmissions.

As shown by reference number 810, a table used to determine a processing time may indicate a set of processing times to be used when the downlink data communication is scheduled via a downlink grant and when the downlink data communication is an initial transmission. As shown, in some aspects, the processing time associated with downlink grants and initial transmissions may be longer than a processing time associated with preconfigured scheduling and initial transmissions, and may be shorter than a processing time associated with downlink grants and retransmissions.

As shown by reference number 815, a table used to determine a processing time may indicate a set of processing times to be used when the downlink data communication is scheduled via a downlink grant and when the downlink data communication is a retransmission. As shown, in some aspects, the processing time associated with downlink grants and retransmissions may be longer than a processing time associated with preconfigured scheduling and initial transmissions, and may be longer than a processing time associated with downlink grants and initial transmissions.

As indicated above, FIG. 8 is provided as an example. Other examples are possible and may differ from what was described with respect to FIG. 8.

Figure 9:
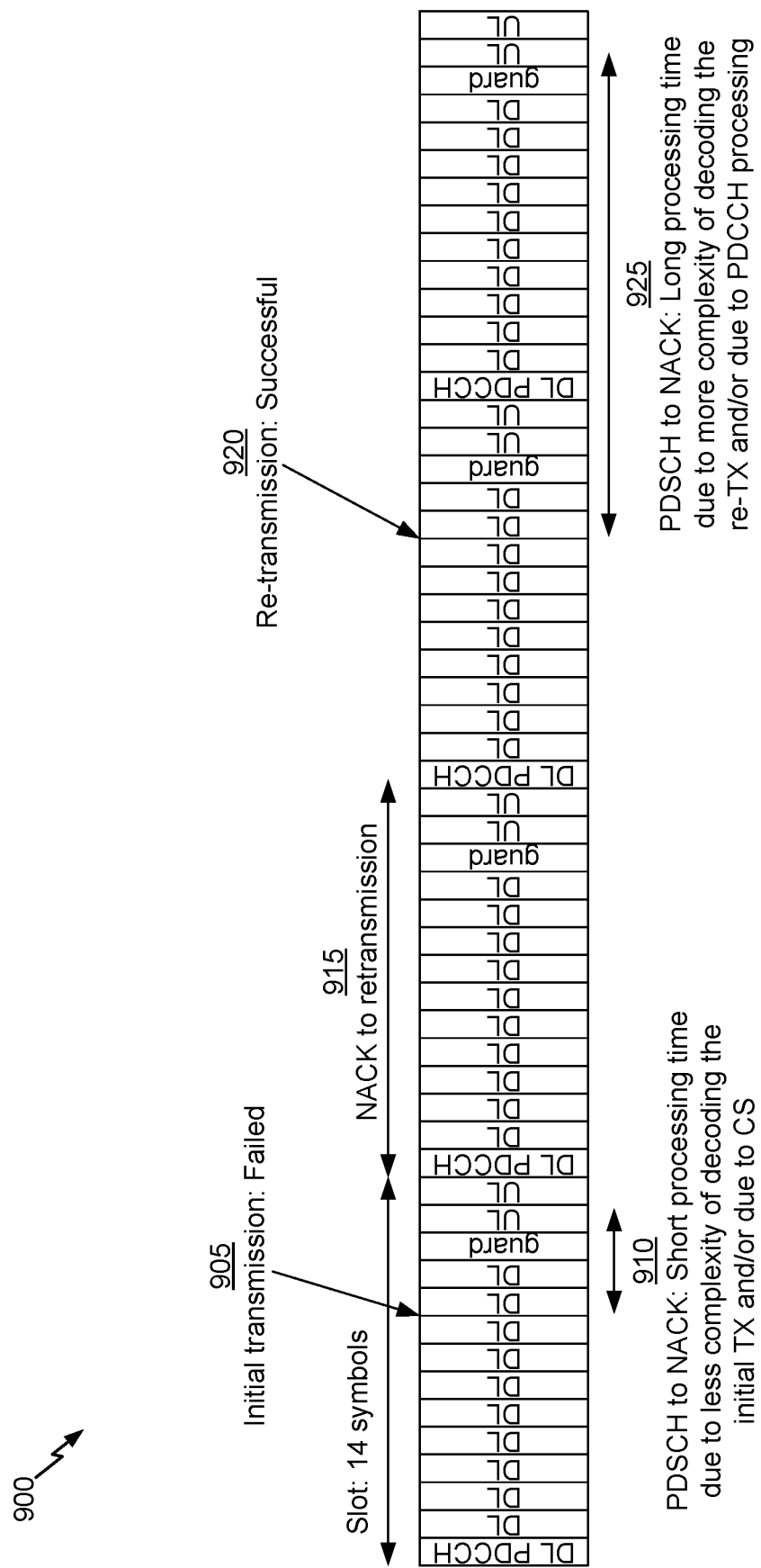

FIG. 9 is a diagram illustrating another example 900 of low latency ACK or NACK, in accordance with various aspects of the present disclosure.

As shown by reference number 905, an initial transmission (e.g., a downlink data communication) from a base station 110 to a UE 120 may fail in a first slot, such as when the initial transmission experiences an error, fails a cyclic redundancy check, and/or the like.

As shown by reference number 910, the UE 120 may be capable of using a short processing time for a timing between the end of the initial transmission and transmission of ACK/NACK feedback corresponding to the initial transmission. As described elsewhere herein, the UE 120 may use the short processing time because the transmission is an initial transmission (and not a retransmission) and/or because the initial transmission was scheduled using preconfigured scheduling. In some aspects, the UE 120 may be capable of transmitting the ACK/NACK feedback in the same slot (e.g., a self-contained slot) in which the downlink data communication was received, which may be referred to as immediate ACK/NACK feedback. For example, the UE 120 may receive the downlink data communication in a downlink data portion of the slot, and may transmit the ACK/NACK feedback in an uplink short burst portion of the slot.

As shown by reference number 915, the base station 110 may receive the NACK, and may process a retransmission of the initial transmission. For example, the base station 110 may transmit the retransmission in a third slot (e.g., due to processing the NACK and/or preparing the retransmission in the second slot). The retransmission may be scheduled using a downlink grant in PDCCH of the third slot.

As shown by reference number 920, the UE 120 may successfully receive the retransmission in the third slot. As shown by reference number 925, the UE 120 may use a long processing time for a timing between the end of the retransmission and transmission of ACK/NACK feedback corresponding to the retransmission. As described elsewhere herein, the UE 120 may use the long processing time because the transmission is a retransmission (and not an initial transmission) and/or because the retransmission was scheduled using a downlink grant in DCI of the PDCCH. In this case, the UE 120 may transmit the ACK/NACK feedback in a different slot than the slot in which the retransmission of the downlink data communication was received. For example, the UE 120 may receive the retransmission in the third slot, and may transmit the ACK/NACK feedback in the fourth slot.

By using different processing times for different scenarios, the UE 120 may reduce processing time when possible, thereby reducing latency and increasing the likelihood of satisfying a latency requirement, a reliability requirement, a URLLC requirement, and/or the like.

As indicated above, FIG. 9 is provided as an example. Other examples are possible and may differ from what was described with respect to FIG. 9.

Figure 10:
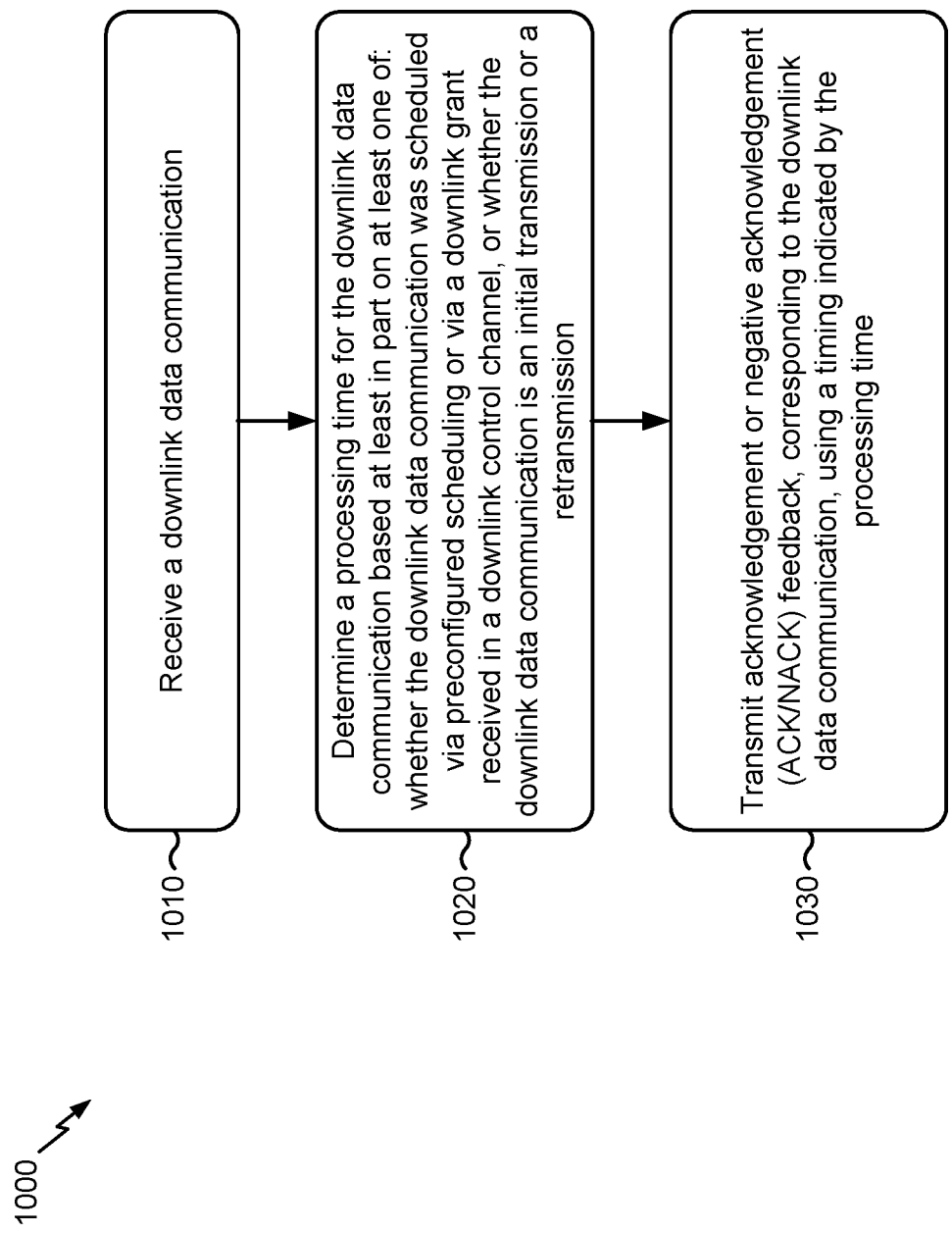
FIG. 10 is a diagram illustrating an example process performed, for example, by a user equipment, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120 and/or the like) performs operations associated with low latency ACK or NACK.

As shown in FIG. 10, in some aspects, process 1000 may include receiving a downlink data communication (block 1010). For example, the UE may receive (e.g., using antenna 252, DEMOD 254, MIMO detector 256, receive processor 258, controller/processor 280, and/or the like) a downlink data communication, as described above in connection with FIGS. 7-9.

As further shown in FIG. 10, in some aspects, process 1000 may include determining a processing time for the downlink data communication based at least in part on at least one of: whether the downlink data communication was scheduled via preconfigured scheduling or via a downlink grant received in a downlink control channel, or whether the downlink data communication is an initial transmission or a retransmission (block 1020). For example, the UE may determine (e.g., using controller/processor 280 and/or the like) a processing time for the downlink data communication, as described above in connection with FIGS. 7-9. In some aspects, the processing time may be determined based at least in part on at least one of: whether the downlink data communication was scheduled via preconfigured scheduling or via a downlink grant received in a downlink control channel, or whether the downlink data communication is an initial transmission or a retransmission.

As further shown in FIG. 10, in some aspects, process 1000 may include transmitting acknowledgement or negative acknowledgement (ACK/NACK) feedback, corresponding to the downlink data communication, using a timing indicated by the processing time (block 1030). For example, the UE may transmit (e.g., using controller/processor 280, transmit processor 264, TX MIMO processor 266, MOD 254, antenna 252, and/or the like) ACK/NACK feedback, corresponding to the downlink data communication, using a timing indicated by the processing time, as described above in connection with FIGS. 7-9.

Process 1000 may include additional aspects, such as any single aspect or any combination of aspects described below and/or in combination with one or more other processes described herein.

In some aspects, the processing time corresponds to an $N_1$ value in a Third Generation Partnership Project (3GPP) standard, and the $N_1$ value represents a physical downlink shared channel (PDSCH) processing or decoding time. In some aspects, the processing time indicates a number of symbols from an end of reception of the downlink data communication to a beginning of transmission of the ACK/NACK feedback.

In some aspects, the processing time is shorter when the downlink data communication was scheduled via the preconfigured scheduling and is longer when the downlink data communication was scheduled via the downlink grant received in the downlink control channel. In some aspects, the processing time is shorter when the downlink data communication is the initial transmission and is longer when the downlink data communication is the retransmission.

In some aspects, the processing time is determined using one or more tables stored in memory of the UE. In some aspects, the one or more tables include at least one of: a table that indicates a set of processing times to be used when the downlink data communication is scheduled via the preconfigured scheduling, a table that indicates a set of processing times to be used when the downlink data communication is scheduled via the downlink grant received in the downlink control channel, a table that indicates a set of processing times to be used when the downlink data communication is the initial transmission, a table that indicates a set of processing times to be used when the downlink data communication is the retransmission, or a combination thereof. In some aspects, the one or more tables include at least one of: a table that indicates a set of processing times to be used when the downlink data communication is scheduled via the preconfigured scheduling and when the downlink data communication is the initial transmission, a table that indicates a set of processing times to be used when the downlink data communication is scheduled via the downlink grant and when the downlink data communication is the initial transmission, a table that indicates a set of processing times to be used when the downlink data communication is scheduled via the downlink grant and when the downlink data communication is the retransmission, or a combination thereof.

In some aspects, the processing time is signaled to the UE by a base station. In some aspects, the processing time is prespecified (e.g., according to a wireless communication standard, such as a 3GPP standard). In some aspects, the processing time is hard coded in memory of the UE. In some aspects, the processing time is determined based at least in part on a capability of the UE. In some aspects, the processing time is determined based at least in part on one or more parameters associated with the preconfigured scheduling. In some aspects, the one or more parameters include at least one of: a packet size associated with the preconfigured scheduling, a modulation and coding scheme associated with the preconfigured scheduling, or a combination thereof.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
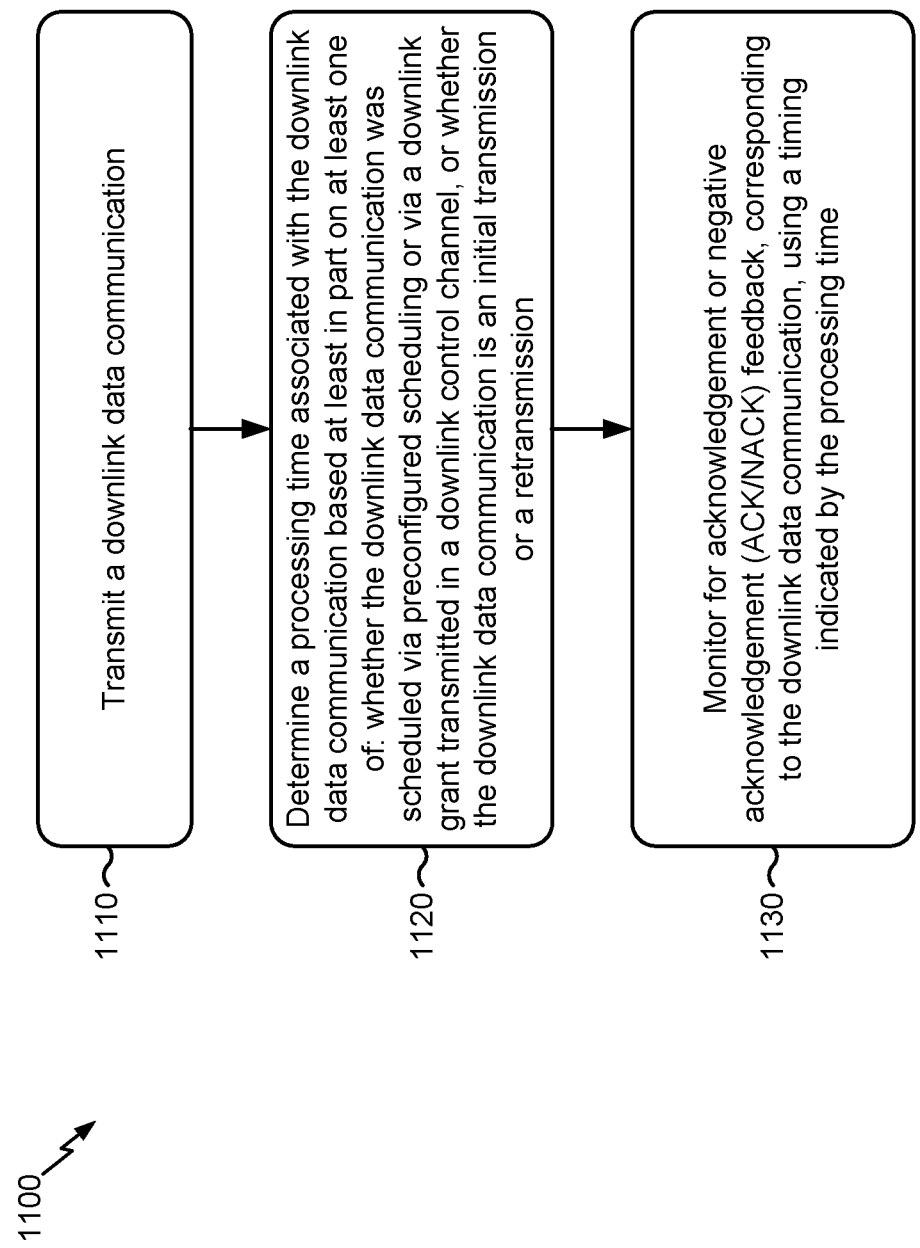
FIG. 11 is a diagram illustrating an example process performed, for example, by a base station, in accordance with various aspects of the present disclosure.

FIG. 11 is a diagram illustrating an example process 1100 performed, for example, by a base station, in accordance with various aspects of the present disclosure. Example process 1100 is an example where a base station (e.g., base station 110 and/or the like) performs operations associated with low latency ACK or NACK.

As shown in FIG. 11, in some aspects, process 1100 may include transmitting a downlink data communication (block 1110). For example, the base station may transmit (e.g., using controller/processor 240, transmit processor 220, TX MIMO processor 230, MOD 232, antenna 234, and/or the like) a downlink data communication, as described above in connection with FIGS. 7-9.

As further shown in FIG. 11, in some aspects, process 1100 may include determining a processing time associated with the downlink data communication based at least in part on at least one of: whether the downlink data communication was scheduled via preconfigured scheduling or via a downlink grant transmitted in a downlink control channel, or whether the downlink data communication is an initial transmission or a retransmission (block 1120). For example, the base station may determine (e.g., using controller/processor 240 and/or the like) a processing time associated with the downlink data communication, as described above in connection with FIGS. 7-9. In some aspects, the processing time may be determined based at least in part on at least one of: whether the downlink data communication was scheduled via preconfigured scheduling or via a downlink grant received in a downlink control channel, or whether the downlink data communication is an initial transmission or a retransmission.

As further shown in FIG. 11, in some aspects, process 1100 may include monitoring for acknowledgement or negative acknowledgement (ACK/NACK) feedback, corresponding to the downlink data communication, using a timing indicated by the processing time (block 1130). For example, the base station may monitor (e.g., using antenna 234, DEMOD 232, MIMO detector 236, receive processor 238, controller/processor 240, and/or the like) for acknowledgement or negative acknowledgement (ACK/NACK) feedback, corresponding to the downlink data communication, using a timing indicated by the processing time, as described above in connection with FIGS. 7-9.

Process 1100 may include additional aspects, such as any single aspect or any combination of aspects described below and/or in combination with one or more other processes described herein.

In some aspects, the processing time corresponds to an $N_1$ value in a Third Generation Partnership Project (3GPP) standard, and the $N_1$ value represents a physical downlink shared channel (PDSCH) processing or decoding time. In some aspects, the processing time indicates a number of symbols from an end of reception of the downlink data communication by a user equipment (UE) to a beginning of transmission of the ACK/NACK feedback by the UE.

In some aspects, the processing time is shorter when the downlink data communication was scheduled via the preconfigured scheduling and is longer when the downlink data communication was scheduled via the downlink grant received in the downlink control channel. In some aspects, the processing time is shorter when the downlink data communication is the initial transmission and is longer when the downlink data communication is the retransmission.

In some aspects, the processing time is determined using one or more tables stored in memory of the base station. In some aspects, the one or more tables include at least one of: a table that indicates a set of processing times to be used when the downlink data communication is scheduled via the preconfigured scheduling, a table that indicates a set of processing times to be used when the downlink data communication is scheduled via the downlink grant transmitted in the downlink control channel, a table that indicates a set of processing times to be used when the downlink data communication is the initial transmission, a table that indicates a set of processing times to be used when the downlink data communication is the retransmission, or a combination thereof. In some aspects, the one or more tables include at least one of: a table that indicates a set of processing times to be used when the downlink data communication is scheduled via the preconfigured scheduling and when the downlink data communication is the initial transmission, a table that indicates a set of processing times to be used when the downlink data communication is scheduled via the downlink grant and when the downlink data communication is the initial transmission, a table that indicates a set of processing times to be used when the downlink data communication is scheduled via the downlink grant and when the downlink data communication is the retransmission, or a combination thereof.

In some aspects, the processing time is signaled, by the base station, to a user equipment to which the downlink data communication was transmitted. In some aspects, the signaled processing time includes a single value. In some aspects, the signaled processing time includes multiple values. In some aspects, the processing time is prespecified (e.g., according to a wireless communication standard, such as a 3 GPP standard). In some aspects, the processing time is hard coded in memory of the base station. In some aspects, the processing time is determined based at least in part on a capability of a user equipment to which the downlink data communication was transmitted.

In some aspects, the processing time is determined based at least in part on one or more parameters associated with the preconfigured scheduling. In some aspects, the one or more parameters include at least one of: a packet size associated with the preconfigured scheduling, a modulation and coding scheme associated with the preconfigured scheduling, or a combination thereof. In some aspects, the base station is configured to make one or more scheduling or resource management decisions for a user equipment (UE) based at least in part on the processing time and at least one of a reliability or latency requirement associated with the UE.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
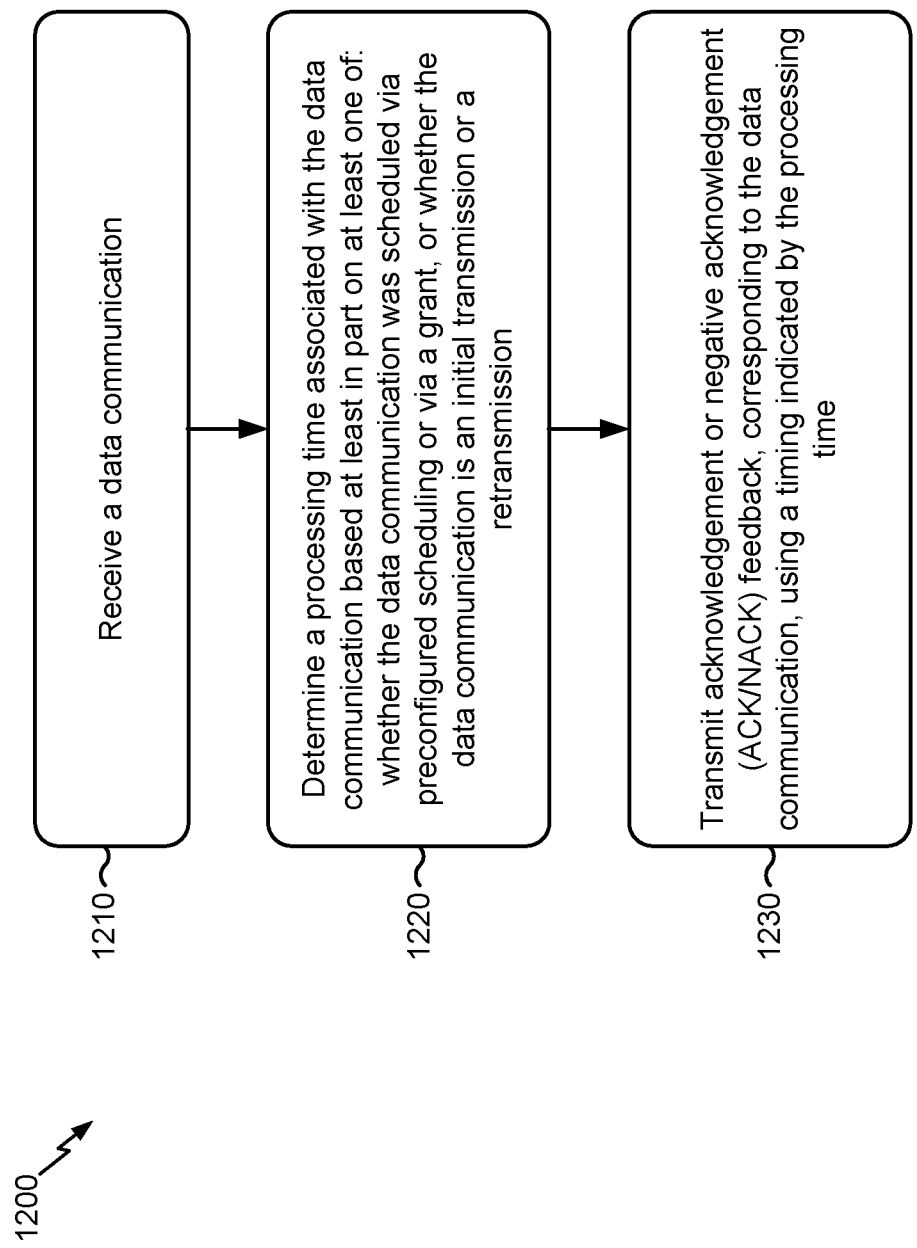
FIG. 12 is a diagram illustrating an example process performed, for example, by a wireless communication device, in accordance with various aspects of the present disclosure.

FIG. 12 is a diagram illustrating an example process 1200 performed, for example, by a wireless communication device, in accordance with various aspects of the present disclosure. Example process 1200 is an example where a wireless communication device (e.g., base station 110, UE 120, a transmitter, a receiver, and/or the like) performs operations associated with low latency ACK or NACK.

As shown in FIG. 12, in some aspects, process 1200 may include receiving a data communication (block 1210). For example, the wireless communication device (e.g., using antenna 252, DEMOD 254, MIMO detector 256, receive processor 258, controller/processor 280, antenna 234, DEMOD 232, MIMO detector 236, receive processor 238, controller/processor 240, and/or the like) may receive a data communication, as described above.

As further shown in FIG. 12, in some aspects, process 1200 may include determining a processing time associated with the data communication based at least in part on at least one of: whether the data communication was scheduled via preconfigured scheduling or via a grant, or whether the data communication is an initial transmission or a retransmission (block 1220). For example, the wireless communication device (e.g., using controller/processor 280, controller/processor 240 and/or the like) may determine a processing time for the data communication, as described above. In some aspects, the processing time may be determined based at least in part on at least one of: whether the data communication was scheduled via preconfigured scheduling or via a grant (e.g., in DCI), or whether the data communication is an initial transmission or a retransmission.

As further shown in FIG. 12, in some aspects, process 1200 may include transmitting acknowledgement or negative acknowledgement (ACK/NACK) feedback, corresponding to the data communication, using a timing indicated by the processing time (block 1230). For example, the wireless communication device (e.g., using controller/processor 280, transmit processor 264, TX MIMO processor 266, MOD 254, antenna 252, controller/processor 240, transmit processor 220, TX MIMO processor 230, MOD 232, antenna 234, and/or the like) may transmit ACK/NACK feedback, corresponding to the data communication, using a timing indicated by the processing time, as described above.

Process 1200 may include additional aspects, such as any single aspect or any combination of aspects described below and/or in combination with one or more other processes described herein.

In some aspects, the processing time corresponds to an $N_1$ value in a Third Generation Partnership Project (3GPP) standard. In some aspects, the $N_1$ value represents a physical downlink shared channel (PDSCH) processing or decoding time. In some aspects, the processing time indicates a number of symbols from an end of reception of the data communication to a beginning of transmission of the ACK/NACK feedback.

In some aspects, the processing time is shorter when the data communication was scheduled via the preconfigured scheduling and is longer when the data communication was scheduled via the grant. In some aspects, the processing time is shorter when the data communication is the initial transmission and is longer when the data communication is the retransmission.

In some aspects, the processing time is determined using one or more tables stored in memory of the UE. In some aspects, the one or more tables include at least one of: a table that indicates a set of processing times to be used when the data communication is scheduled via the preconfigured scheduling, a table that indicates a set of processing times to be used when the data communication is scheduled via the grant, a table that indicates a set of processing times to be used when the data communication is the initial transmission, a table that indicates a set of processing times to be used when the data communication is the retransmission, or a combination thereof. In some aspects, the one or more tables include at least one of: a table that indicates a set of processing times to be used when the data communication is scheduled via the preconfigured scheduling and when the data communication is the initial transmission, a table that indicates a set of processing times to be used when the data communication is scheduled via the grant and when the data communication is the initial transmission, a table that indicates a set of processing times to be used when the data communication is scheduled via the grant and when the data communication is the retransmission, or a combination thereof.

In some aspects, the processing time is signaled to the wireless communication device. In some aspects, the processing time is prespecified (e.g., according to a wireless communication standard, such as a 3GPP standard). In some aspects, the processing time is hard coded in memory of the wireless communication device. In some aspects, the processing time is determined based at least in part on a capability of the wireless communication device. In some aspects, the processing time is determined based at least in part on one or more parameters associated with the preconfigured scheduling. In some aspects, the one or more parameters include at least one of: a packet size associated with the preconfigured scheduling, a modulation and coding scheme associated with the preconfigured scheduling, or a combination thereof.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
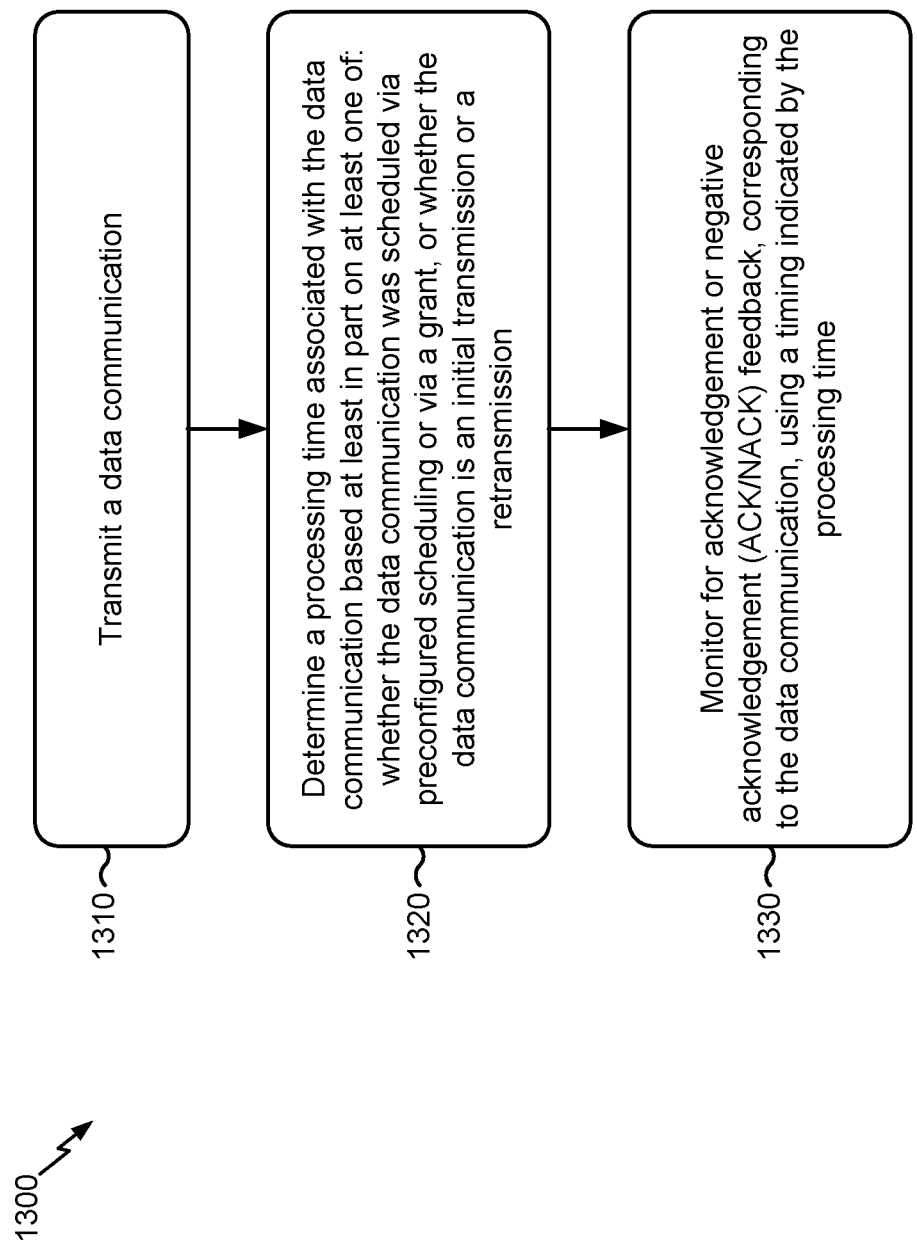
FIG. 13 is a diagram illustrating an example process performed, for example, by a wireless communication device, in accordance with various aspects of the present disclosure.

FIG. 13 is a diagram illustrating an example process 1300 performed, for example, by a wireless communication device, in accordance with various aspects of the present disclosure. Example process 1300 is an example where a wireless communication device (e.g., base station 110, UE 120, a transmitter, a receiver, and/or the like) performs operations associated with low latency ACK or NACK.

As shown in FIG. 13, in some aspects, process 1300 may include transmitting a data communication (block 1310). For example, the wireless communication device (e.g., using controller/processor 280, transmit processor 264, TX MIMO processor 266, MOD 254, antenna 252, controller/processor 240, transmit processor 220, TX MIMO processor 230, MOD 232, antenna 234, and/or the like) may transmit a data communication, as described above.

As further shown in FIG. 13, in some aspects, process 1300 may include determining a processing time associated with the data communication based at least in part on at least one of: whether the data communication was scheduled via preconfigured scheduling or via a grant, or whether the data communication is an initial transmission or a retransmission (block 1320). For example, the wireless communication device (e.g., using controller/processor 280, controller/processor 240 and/or the like) may determine a processing time associated with the data communication, as described above. In some aspects, the processing time may be determined based at least in part on at least one of: whether the data communication was scheduled via preconfigured scheduling or via a grant, or whether the data communication is an initial transmission or a retransmission.

As further shown in FIG. 13, in some aspects, process 1300 may include monitoring for acknowledgement or negative acknowledgement (ACK/NACK) feedback, corresponding to the data communication, using a timing indicated by the processing time (block 1330). For example, the wireless communication device (e.g., using antenna 252, DEMOD 254, MIMO detector 256, receive processor 258, controller/processor 280, antenna 234, DEMOD 232, MIMO detector 236, receive processor 238, controller/ processor 240, and/or the like) may monitor for ACK/NACK feedback, corresponding to the data communication, using a timing indicated by the processing time, as described above.

Process 1300 may include additional aspects, such as any single aspect or any combination of aspects described below and/or in combination with one or more other processes described herein.

In some aspects, the processing time corresponds to an $N_1$ value in a Third Generation Partnership Project (3GPP) standard. In some aspects, the $N_1$ value represents a physical downlink shared channel (PDSCH) processing or decoding time. In some aspects, the processing time indicates a number of symbols from an end of reception of the data communication to a beginning of transmission of the ACK/NACK feedback.

In some aspects, the processing time is shorter when the data communication was scheduled via the preconfigured scheduling and is longer when the data communication was scheduled via the grant. In some aspects, the processing time is shorter when the data communication is the initial transmission and is longer when the data communication is the retransmission.

In some aspects, the processing time is determined using one or more tables stored in memory of the wireless communication device. In some aspects, the one or more tables include at least one of: a table that indicates a set of processing times to be used when the data communication is scheduled via the preconfigured scheduling, a table that indicates a set of processing times to be used when the data communication is scheduled via the grant, a table that indicates a set of processing times to be used when the data communication is the initial transmission, a table that indicates a set of processing times to be used when the data communication is the retransmission, or a combination thereof. In some aspects, the one or more tables include at least one of: a table that indicates a set of processing times to be used when the data communication is scheduled via the preconfigured scheduling and when the data communication is the initial transmission, a table that indicates a set of processing times to be used when the data communication is scheduled via the grant and when the data communication is the initial transmission, a table that indicates a set of processing times to be used when the data communication is scheduled via the grant and when the data communication is the retransmission, or a combination thereof.

In some aspects, the processing time is signaled, by the wireless communication device, to another device to which the data communication was transmitted. In some aspects, the signaled processing time includes a single value. In some aspects, the signaled processing time includes multiple values. In some aspects, the processing time is prespecified (e.g., according to a wireless communication standard, such as a 3GPP standard). In some aspects, the processing time is hard coded in memory of the wireless communication device. In some aspects, the processing time is determined based at least in part on a capability of a device to which the data communication was transmitted.

In some aspects, the processing time is determined based at least in part on one or more parameters associated with the preconfigured scheduling. In some aspects, the one or more parameters include at least one of: a packet size associated with the preconfigured scheduling, a modulation and coding scheme associated with the preconfigured scheduling, or a combination thereof. In some aspects, the wireless communication device is configured to make one or more scheduling or resource management decisions for a device to which the data communication is transmitted based at least in part on the processing time and at least one of a reliability or latency requirement associated with the device to which the data communication is transmitted.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be openended terms. Further, the phrase "based on" is intended to mean "based, at least in part, on" unless explicitly stated otherwise.

What is claimed is:

1. A method of wireless communication performed by a user equipment (UE), comprising:
   receiving a downlink data communication;
   determining a processing time for the downlink data communication based at least in part on at least one of:
      whether the downlink data communication was scheduled via preconfigured scheduling or via a downlink grant received in a downlink control channel, wherein the processing time is a first time when the downlink data communication was scheduled via the preconfigured scheduling and is a second time, greater than the first time, when the downlink data communication was scheduled via the downlink grant received in the downlink control channel, or
      whether the downlink data communication is an initial transmission or a retransmission, wherein the processing time is a third time when the downlink data communication is the initial transmission and is a fourth time, greater than the third time, when the downlink data communication is the retransmission; and
   transmitting acknowledgement or negative acknowledgement (ACK/NACK) feedback, corresponding to the downlink data communication, using a timing indicated by the processing time.

2. The method of claim 1, wherein the processing time corresponds to an $N_1$ value in a Third Generation Partnership Project (3GPP) standard, wherein the $N_1$ value represents a physical downlink shared channel (PDSCH) processing or decoding time.

3. The method of claim 1, wherein the processing time indicates a number of symbols from an end of reception of the downlink data communication to a beginning of transmission of the ACK/NACK feedback.

4. The method of claim 1, wherein the processing time is determined using one or more tables stored by the UE.

5. The method of claim 4, wherein the one or more tables include at least one of:
   a table that indicates a set of processing times to be used when the downlink data communication is scheduled via the preconfigured scheduling,
   a table that indicates a set of processing times to be used when the downlink data communication is scheduled via the downlink grant received in the downlink control channel,
   a table that indicates a set of processing times to be used when the downlink data communication is the initial transmission,
   a table that indicates a set of processing times to be used when the downlink data communication is the retransmission, or
   a combination thereof.

6. The method of claim 4, wherein the one or more tables include at least one of:
   a table that indicates a set of processing times to be used when the downlink data communication is scheduled via the preconfigured scheduling and when the downlink data communication is the initial transmission,
   a table that indicates a set of processing times to be used when the downlink data communication is scheduled via the downlink grant and when the downlink data communication is the initial transmission,
   a table that indicates a set of processing times to be used when the downlink data communication is scheduled via the downlink grant and when the downlink data communication is the retransmission, or
   a combination thereof.

7. The method of claim 1, wherein the processing time is prespecified, signaled to the UE by a base station, determined based at least in part on a capability of the UE, or a combination thereof.

8. The method of claim 1, wherein the processing time is determined based at least in part on one or more parameters associated with the preconfigured scheduling.

9. The method of claim 8, wherein the one or more parameters include at least one of:
   a packet size associated with the preconfigured scheduling,
   a modulation and coding scheme associated with the preconfigured scheduling, or
   a combination thereof.

10. A method of wireless communication performed by a base station, comprising:
    transmitting a downlink data communication;
    determining a processing time associated with the downlink data communication based at least in part on at least one of:
       whether the downlink data communication was scheduled via preconfigured scheduling or via a downlink grant transmitted in a downlink control channel, wherein the processing time is a first time when the downlink data communication was scheduled via the preconfigured scheduling and is a second time, greater than the first time, when the downlink data communication was scheduled via the downlink grant received in the downlink control channel, or
       whether the downlink data communication is an initial transmission or a retransmission, wherein the processing time is a third time when the downlink data communication is the initial transmission and is a fourth time, greater than the third time, when the downlink data communication is the retransmission; and
    monitoring for acknowledgement or negative acknowledgement (ACK/NACK) feedback, corresponding to the downlink data communication, using a timing indicated by the processing time.

11. The method of claim 10, wherein the processing time corresponds to an $N_1$ value in a Third Generation Partnership Project (3GPP) standard, wherein the $N_1$ value represents a physical downlink shared channel (PDSCH) processing or decoding time.

12. The method of claim 10, wherein the processing time indicates a number of symbols from an end of reception of the downlink data communication by a user equipment (UE) to a beginning of transmission of the ACK/NACK feedback by the UE.

13. The method of claim 10, wherein the processing time is determined using one or more tables stored by the base station.

14. The method of claim 13, wherein the one or more tables include at least one of:
    a table that indicates a set of processing times to be used when the downlink data communication is scheduled via the preconfigured scheduling,
    a table that indicates a set of processing times to be used when the downlink data communication is scheduled via the downlink grant transmitted in the downlink control channel, a table that indicates a set of processing times to be used when the downlink data communication is the initial transmission,
a table that indicates a set of processing times to be used when the downlink data communication is the retransmission, or
a combination thereof.

15. The method of claim 13, wherein the one or more tables include at least one of:
a table that indicates a set of processing times to be used when the downlink data communication is scheduled via the preconfigured scheduling and when the downlink data communication is the initial transmission,
a table that indicates a set of processing times to be used when the downlink data communication is scheduled via the downlink grant and when the downlink data communication is the initial transmission,
a table that indicates a set of processing times to be used when the downlink data communication is scheduled via the downlink grant and when the downlink data communication is the retransmission, or
a combination thereof.

16. The method of claim 10, wherein the processing time is prespecified, determined based at least in part on a capability of a user equipment (UE) to which the downlink data communication was transmitted, signaled by the base station to the UE, determined based at least in part on one or more parameters associated with the preconfigured scheduling, or a combination thereof.

17. The method of claim 16, wherein the processing time is signaled as a single value.

18. The method of claim 16, wherein the processing time is signaled as multiple values.

19. The method of claim 16, wherein the one or more parameters associated with the preconfigured scheduling include at least one of:
a packet size associated with the preconfigured scheduling,
a modulation and coding scheme associated with the preconfigured scheduling, or
a combination thereof.

20. The method of claim 10, wherein the base station is configured to make one or more scheduling or resource management decisions for a user equipment (UE) based at least in part on the processing time and at least one of a reliability or latency requirement associated with the UE.

21. A user equipment (UE) for wireless communication, comprising:
memory; and
one or more processors coupled to the memory, the memory and the one or more processors configured to:
receive a downlink data communication;
determine a processing time for the downlink data communication based at least in part on at least one of:
whether the downlink data communication was scheduled via preconfigured scheduling or via a downlink grant received in a downlink control channel, wherein the processing time is a first time when the downlink data communication was scheduled via the preconfigured scheduling and is a second time, greater than the first time, when the downlink data communication was scheduled via the downlink grant received in the downlink control channel, or
whether the downlink data communication is an initial transmission or a retransmission, wherein the processing time is a third time when the downlink data communication is the initial transmission and is a fourth time, greater than the third time, when the downlink data communication is the retransmission; and
transmit acknowledgement or negative acknowledgement (ACK/NACK) feedback, corresponding to the downlink data communication, using a timing indicated by the processing time.

22. The UE of claim 21, wherein the one or more processors are further configured to process the downlink data communication based at least in part on the processing time.

23. The UE of claim 21, wherein the processing time corresponds to an $N_1$ value in a Third Generation Partnership Project (3GPP) standard, wherein the $N_1$ value represents a physical downlink shared channel (PDSCH) processing or decoding time.

24. The UE of claim 21, wherein the processing time is determined using one or more tables stored in the memory of the UE, wherein the one or more tables include at least one of:
a table that indicates a set of processing times to be used when the downlink data communication is scheduled via the preconfigured scheduling,
a table that indicates a set of processing times to be used when the downlink data communication is scheduled via the downlink grant received in the downlink control channel,
a table that indicates a set of processing times to be used when the downlink data communication is the initial transmission,
a table that indicates a set of processing times to be used when the downlink data communication is the retransmission, or
a combination thereof.

25. The UE of claim 21, wherein the processing time is determined using one or more tables stored in the memory of the UE, wherein the one or more tables include at least one of:
a table that indicates a set of processing times to be used when the downlink data communication is scheduled via the preconfigured scheduling and when the downlink data communication is the initial transmission,
a table that indicates a set of processing times to be used when the downlink data communication is scheduled via the downlink grant and when the downlink data communication is the initial transmission, or
a table that indicates a set of processing times to be used when the downlink data communication is scheduled via the downlink grant and when the downlink data communication is the retransmission.

26. The UE of claim 21, wherein the processing time is determined based at least in part on one or more parameters associated with the preconfigured scheduling.

27. A base station for wireless communication, comprising:
memory; and
one or more processors coupled to the memory, the memory and the one or more processors configured to:
transmit a downlink data communication;
determine a processing time associated with the downlink data communication based at least in part on at least one of:
whether the downlink data communication was scheduled via preconfigured scheduling or via a downlink grant transmitted in a downlink control channel, wherein the processing time is a first time when the downlink data communication was scheduled via the preconfigured scheduling and is a second time, greater than the first time, when the downlink data communication was scheduled via the downlink grant received in the downlink control channel, or whether the downlink data communication is an initial transmission or a retransmission, wherein the processing time is a third time when the downlink data communication is the initial transmission and is a fourth time, greater than the third time, when the downlink data communication is the retransmission; and monitor for acknowledgement or negative acknowledgement (ACK/NACK) feedback, corresponding to the downlink data communication, using a timing indicated by the processing time.

28. The base station of claim 27, wherein the processing time corresponds to an $N_1$ value in a Third Generation Partnership Project (3GPP) standard, wherein the $N_1$ value represents a physical downlink shared channel (PDSCH) processing or decoding time.

29. The base station of claim 27, wherein the processing time is determined using one or more tables stored by the base station.

30. The base station of claim 29, wherein the one or more tables include at least one of:
- a table that indicates a set of processing times to be used when the downlink data communication is scheduled via the preconfigured scheduling,
- a table that indicates a set of processing times to be used when the downlink data communication is scheduled via the downlink grant transmitted in the downlink control channel,
- a table that indicates a set of processing times to be used when the downlink data communication is the initial transmission, or
- a table that indicates a set of processing times to be used when the downlink data communication is the retransmission.

* * * * *